US012196476B2

(12) United States Patent
Ahn et al.

(10) Patent No.: US 12,196,476 B2
(45) Date of Patent: Jan. 14, 2025

(54) REFRIGERATOR AND CONTROL METHOD THEREOF

(71) Applicant: LG ELECTRONICS INC., Seoul (KR)

(72) Inventors: Buhwan Ahn, Seoul (KR); Jinseok Hu, Seoul (KR); Sangil Lee, Seoul (KR); Seonggu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/422,367

(22) Filed: Jan. 25, 2024

(65) Prior Publication Data

US 2024/0183602 A1 Jun. 6, 2024

Related U.S. Application Data

(62) Division of application No. 17/499,044, filed on Oct. 12, 2021, now Pat. No. 11,920,852.

(30) Foreign Application Priority Data

Oct. 12, 2020 (KR) .................... 10-2020-0131328

(51) Int. Cl.
*F25D 17/06* (2006.01)
*F25C 1/00* (2006.01)
(Continued)

(52) U.S. Cl.
CPC .............. *F25D 17/067* (2013.01); *F25C 1/00* (2013.01); *F25D 11/022* (2013.01);
(Continued)

(58) Field of Classification Search
None
See application file for complete search history.

(56) References Cited

U.S. PATENT DOCUMENTS 5,758,512 A     6/1998 Peterson
6,058,723 A *   5/2000 Kusunoki ............... F25D 29/00
                                                       62/155
(Continued)

FOREIGN PATENT DOCUMENTS

KR      2003-0030961 A      4/2003
KR      10-2010-0124068     11/2010
(Continued)

OTHER PUBLICATIONS

Korean Office Action dated Nov. 24, 2021 issued in Application 10-2020-0131328.
(Continued)

*Primary Examiner* — Henry T Crenshaw
(74) *Attorney, Agent, or Firm* — KED & ASSOCIATES, LLP

(57) ABSTRACT

The present disclosure relates to a refrigerator and a control method thereof in one embodiment. The refrigerator in one embodiment may include a storage part including a compressor and an evaporator and configured to store a food item at a low temperature using air cooled by the evaporator, an ice making compartment configured to make or store ice using air cooled by the evaporator, and a fan for making ice allowing air cooled by the evaporator to flow to the ice making compartment, wherein a rotation speed of the fan for making ice changes while the fan for making ice continues to operate during operation of the compressor.

20 Claims, 15 Drawing Sheets

(51) Int. Cl.
*F25D 11/02* (2006.01)
*F25D 17/04* (2006.01)
*F25D 29/00* (2006.01)

(52) U.S. Cl.
CPC ........... *F25D 17/065* (2013.01); *F25D 29/00* (2013.01); *F25B 2600/112* (2013.01); *F25C 2400/10* (2013.01); *F25C 2600/04* (2013.01); *F25D 17/045* (2013.01); *F25D 2317/061* (2013.01); *F25D 2317/0681* (2013.01); *F25D 2317/0682* (2013.01); *F25D 2700/121* (2013.01); *Y02B 30/70* (2013.01)

(56) References Cited

U.S. PATENT DOCUMENTS

| | | | | |
|---|---|---|---|---|
| 2006/0260347 | A1* | 11/2006 | Coulter | F25D 23/00 62/344 |
| 2008/0034768 | A1* | 2/2008 | Pimentel | F25D 17/065 62/180 |
| 2009/0223230 | A1* | 9/2009 | Kim | F25C 1/08 62/73 |
| 2010/0179693 | A1* | 7/2010 | Sung | F25D 29/00 700/275 |
| 2010/0292846 | A1* | 11/2010 | Lee | F25C 1/00 700/275 |
| 2010/0300137 | A1 | 12/2010 | Lim | |
| 2012/0060526 | A1 | 3/2012 | May | |
| 2017/0248348 | A1 | 8/2017 | Kim | |
| 2019/0128597 | A1* | 5/2019 | Kim | F25D 17/065 |
| 2021/0102751 | A1 | 4/2021 | Kim et al. | |

FOREIGN PATENT DOCUMENTS

| | | |
|---|---|---|
| KR | 10-2011-0097014 | 8/2011 |
| KR | 10-2012-0084095 | 7/2012 |
| KR | 2018-0007580 A | 1/2018 |
| KR | 2018-0087799 A | 8/2018 |
| KR | 10-2019-0049080 | 5/2019 |
| KR | 10-2020-0000089 | 1/2020 |
| KR | 2020-0031957 A | 3/2020 |
| KR | 10-2020-0082193 | 7/2020 |

OTHER PUBLICATIONS

Korean Notice of Allowance dated Apr. 5, 2022 issued in Application No. 10-2020-0131328.

U.S. Office Action dated May 9, 2023 issued in parent U.S. Appl. No. 17/499,044.

U.S. Office Action dated Aug. 23, 2023 issued in parent U.S. Appl. No. 17/499,044.

\* cited by examiner

REFRIGERATOR AND CONTROL METHOD THEREOF

CROSS-REFERENCE TO RELATED APPLICATIONS

This application is a Divisional Application of U.S. patent application Ser. No. 17/499,044 filed Oct. 12, 2021, which claims priority to and the benefit of Korean Patent Application No. 10-2020-0131328, filed in Korea on Oct. 12, 2020, the disclosure of which is incorporated herein by reference in its entirety.

BACKGROUND

1. Field

Disclosed herein are a refrigerator and a control method thereof.

2. Background

Refrigerators are devices that keep a food item therein at a low temperature using cool air generated in a cooling cycle. In recent years, refrigerators, providing a variety of functions as well as the function of keeping a food item at a low temperature, have been widely used. Most of the refrigerators include an ice making compartment that make ice.

A control method of a refrigerator is disclosed in document 1 (KR Patent Publication No. 2011-0097014), the subject matter of which is incorporated herein by reference. According to the control method, when a temperature of a freezer compartment is higher than a set freezing temperature, a fan for making ice may be driven at the same time as a compressor starts to operate, and then when a temperature of an ice making compartment is higher than a set ice-making temperature, the fan of the ice making compartment stops operating.

However, when the fan for making ice is controlled, the temperature of the ice making compartment is not controlled accurately. In particular, when a target temperature of the freezer compartment and/or refrigerator compartment is changed, or when operation time and/or an operation ratio of the compressor is changed, the temperature of the ice making compartment does not remain constant. Since the temperature of the ice making compartment is not accurately controlled, a target temperature of the ice making compartment is set to a lower temperature than expected. Thus, the ice making compartment can overly cool, and a large amount of energy can be unnecessarily consumed.

BRIEF DESCRIPTION OF THE DRAWINGS

Embodiments will be described in detail with reference to the following drawings in which like reference numerals refer to like elements, and wherein.

DETAILED DESCRIPTION

Figure 1:
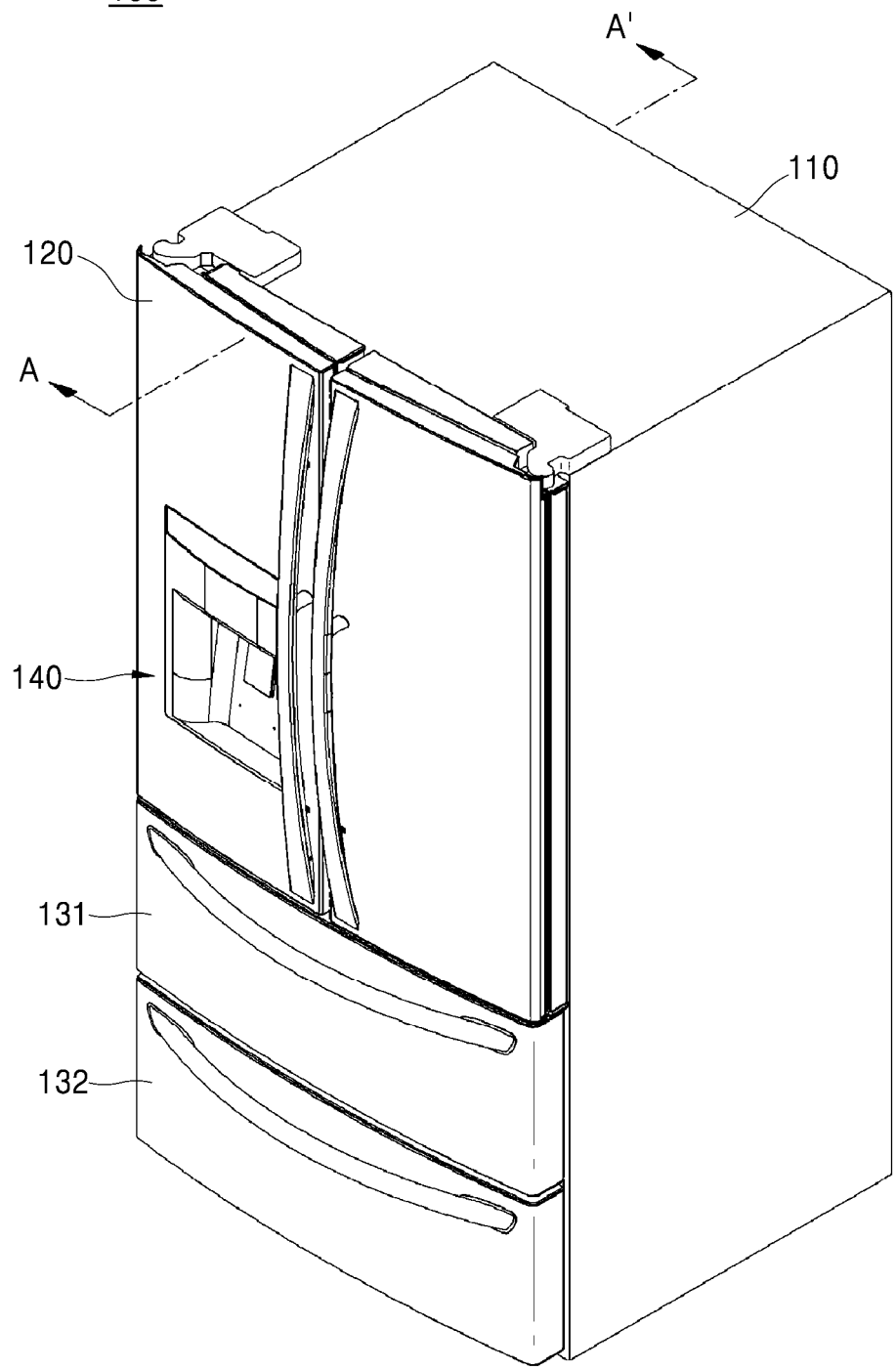
FIG. 1 is a perspective view showing an exterior of a refrigerator in one embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When one component is described as being "in an upper portion (or a lower portion)" of another component, or "on (or under)" another component, one component can be disposed on the upper surface (or under the lower surface) of another component, and an additional component can be interposed between another component and one component on (or under) another component.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Hereunder, a refrigerator and a control method thereof in several embodiments are described.

FIG. 1 is a perspective view showing an exterior of a refrigerator in one embodiment. A refrigerator 100 in one embodiment may include a cabinet 110, a refrigerator compartment door 120, a first freezer compartment door 131, a second freezer compartment door 132, and a dispenser 140.

The cabinet 110 may include a storage part (or storage compartment) configured to store a food item at a low temperature. The storage part may include a refrigerator compartment and/or a freezer compartment.

The refrigerator compartment door 120 may be rotatably coupled to the cabinet 110 to open and close the refrigerator compartment. A pair of refrigerator compartment doors 120 may be provided, and the refrigerator compartment doors 120 may be respectively disposed on the left and the right.

The first freezer door 131 and the second freezer door 132 may be formed into a drawer and open and close the freezer compartment.

The dispenser 140 may be disposed on the refrigerator compartment door 120 and provided to take out water and/or ice.

Figure 2:
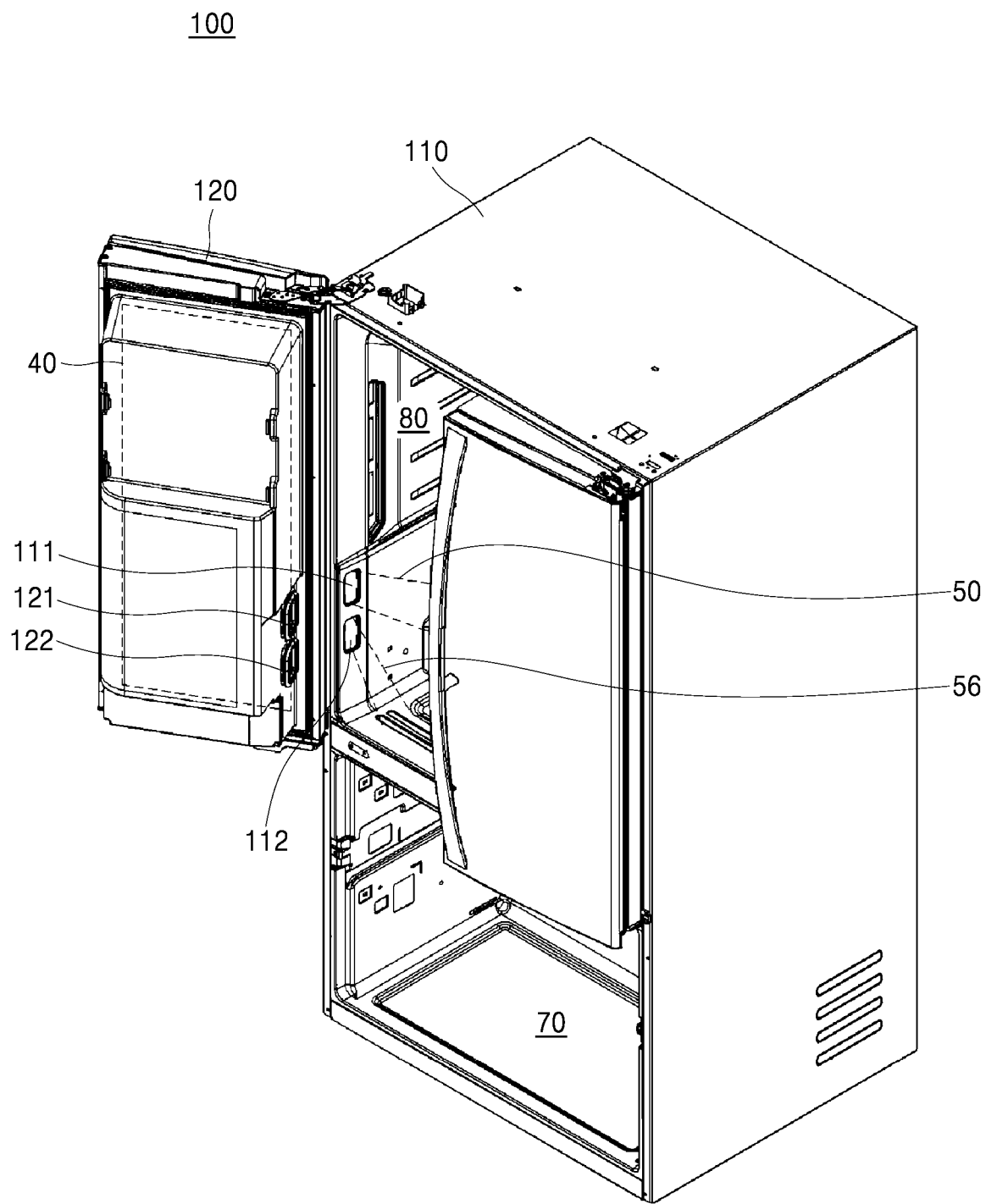
FIG. 2 is a perspective view showing an inner structure of the refrigerator in one embodiment.

FIG. 2 is a perspective view showing an inner structure of the refrigerator in one embodiment. The refrigerator in one embodiment may include a cabinet 110, a refrigerator compartment door 120, an ice making compartment 40, a freezer compartment 70 and a refrigerator compartment 80.

The cabinet 110 may include the freezer compartment 70 and the refrigerator compartment 80 as a storage part. That is, the freezer compartment 70 and the refrigerator compartment 80 may be formed as a storage part configured to store a food item at a low temperature in the cabinet 110.

The ice making compartment 40 may be disposed on the refrigerator compartment door 120. The ice making compartment 40 may produce ice and the produced ice may be taken out from the dispenser (140 in FIG. 1).

A flow path for making ice 50 may supply cool air to the ice making compartment 40. The flow path for making ice 50 may be disposed in the cabinet 110. Specifically, the flow path for making ice 50 may be disposed on a lateral wall of the cabinet 110. The cool air supplied through the flow path for making ice 50 may pass through a cool air supply hole 111 formed in the cabinet 110 and through a cool air inlet 121 formed in the refrigerator compartment door 120 and may be supplied to the ice making compartment 40. Additionally, the cool air of the ice making compartment 40 may pass through a cool air outlet 122 formed in the refrigerator compartment door 120 and through a cool air returning hole 112 formed in the cabinet 110 and may return to any space through a returning flow path 56.

Figure 3:
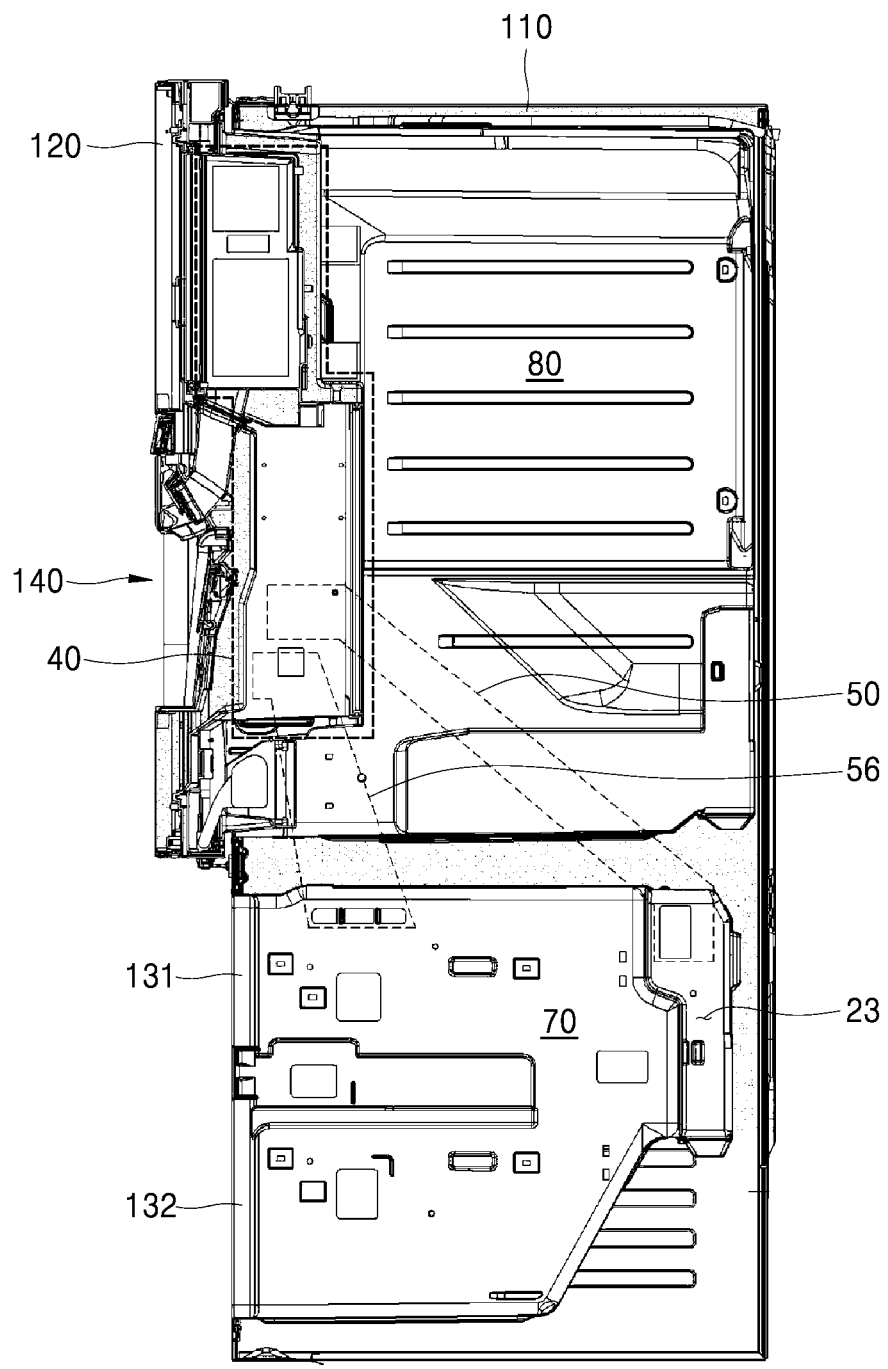
FIG. 3 is a cross-sectional view showing a portion cut along A-A' in FIG. 1.

FIG. 3 is a cross-sectional view showing a portion cut along A-A' in FIG. 1.

A cabinet 110, a refrigerator compartment door 120, a first freezer compartment door 131, a second freezer compartment door 132, a dispenser 140, an ice making compartment 40, a freezer compartment 70, a refrigerator compartment 80, a flow path for making ice 50 and a returning flow path 56 in FIG. 3 have the same configurations and functions as those described with reference to FIGS. 1 and/or 2.

The flow path for making ice 50 may be disposed between a cooling compartment 23, in which an evaporator is disposed, and the ice making compartment 40, and may form a path in which cool air around the evaporator moves to the ice making compartment 40. As described above, the flow path for making ice 50 may be disposed on a lateral wall of the cabinet 110.

FIGS. 1 to 3 show the two freezer compartment doors. However, a proper number of the freezer compartment doors may be provided according to the needs. Unlike the freezer compartment doors illustrated in FIGS. 1 to 3, freezer compartment doors may be formed into a rotary door similar to the refrigerator compartment door.

Further, FIGS. 1 to 3 show the refrigerator provided with the refrigerator compartment in an upper portion thereof and with the freezer compartment in a lower portion thereof. However, a refrigerator may be provided with the freezer compartment in an upper portion thereof and with the refrigerator compartment in a lower portion thereof. Further, FIGS. 1 to 3 show the dispenser disposed on the refrigerator compartment door. However, a dispenser may be disposed on the freezer compartment door.

Figure 4:
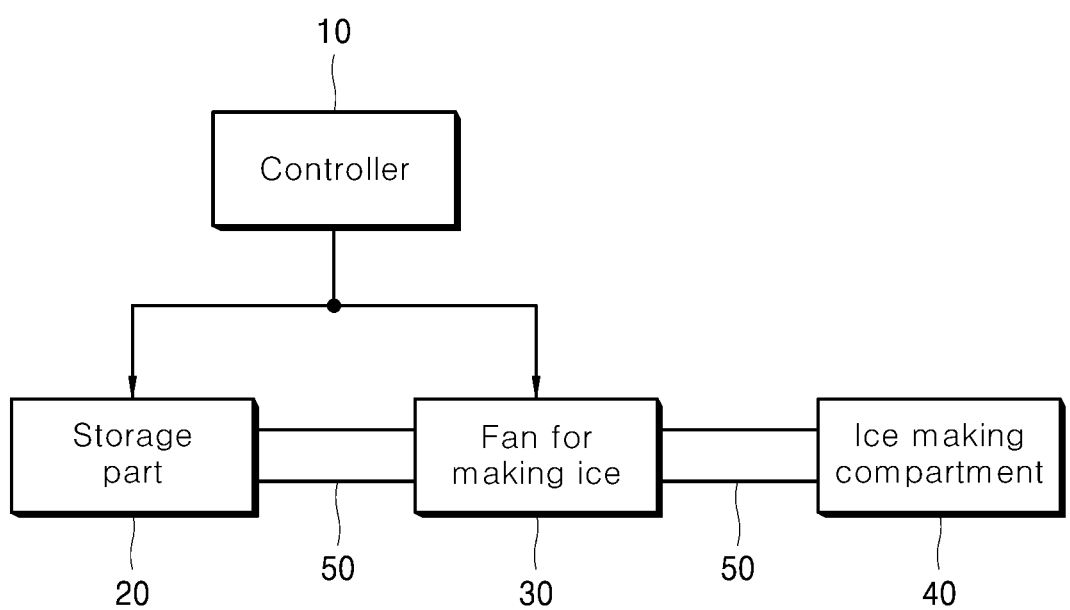
FIG. 4 is a block diagram schematically showing a configuration of the refrigerator in one embodiment.

FIG. 4 is a block diagram schematically showing a configuration of the refrigerator in one embodiment. The refrigerator 100 in one embodiment may include a controller 10, a storage part 20, a fan for making ice 30 (or ice making fan), an ice making compartment 40, and a flow path for making ice 50.

The controller 10 may control the storage part 20 to control temperatures of the freezer compartment and/or the refrigerator compartment that are configured to store a food item. Specifically, the controller 10 may control at least one of a compressor, a damper, a valve and at least one fan to control the temperature of the storage part 20 to control the temperature of the freezer compartment and/or the refrigerator compartment of the storage part 20.

Additionally, the controller 10 may control a speed of the fan for making ice 30 to control a temperature of the ice making compartment 40. In one embodiment, the controller 10 may control the speed of the fan for making ice 30 to control the temperature of the ice making compartment 40, while continuing to operate the fan for making ice 30 during operation of the compressor of the storage part 20. In this case, the controller 10 may adjust the speed of the fan for making ice 30 based on a difference between a measured temperature of the ice making compartment 40 and a target temperature for making ice. And/or, the controller 10 may change the speed of the fan for making ice 30 in accordance with an operation cycle of the storage part 20. In this case, the controller 10 may determine the speed of the fan for making ice 30 in an $n^{th}$ cycle based on a difference between an average of the measured temperature of the ice making compartment 40 and the target temperature for making ice in an $n-1^{th}$ cycle. The operation of the controller 10 is specifically described below.

The controller 10 may include at least one processing unit and at least one memory. The processing unit may include a central processing unit (CPU), a graphics processing unit (GPU), a microprocessor, an application specific integrated circuit (ASIC), a field programmable gate array (FPGA), and the like, and may have a plurality of cores, for example. The memory may be volatile memory (e.g., RAM and the like), non-volatile memory (e.g., ROM, flash memory and the like) or a combination thereof. Additionally, the controller 10 may include an additional storage. The storage may include a magnetic storage, an optical storage, flash memory and the like but not be limited.

A computer readable instruction for implementing the control method of one or more refrigerators disclosed in the present disclosure may be stored in the memory and/or the storage, and another computer readable instruction for implementing an operation system, an application program and the like may be stored in the memory and/or the storage. In some embodiments, a computer readable instruction stored in the storage may be loaded in the memory such that the processing unit executes the computer readable instruction.

Though not illustrated, the refrigerator 100 may include an input device for inputting a set value to the controller 10 and/or an output device for displaying a state of the refrigerator 100 and the like. The input device may include a touch input device, an infrared camera, a video input device and/or any other input device and the like. Additionally, the output device may include one or more displays, one or more speakers and/or any other output devices and the like. The refrigerator 100 may include a communication connector for allowing the controller 10 to communicate with another device. The communication connector may include a local area wireless communication module and/or a wireless frequency transmitter/receiver such as Bluetooth, an infrared port and/or a USB connector and the like.

The storage part 20 may store a food item at a low temperature. Though not illustrated in FIG. 1, the storage part 20 may include a heat exchanger including a compressor and an evaporator, a freezer compartment configured to keep a food item frozen using air around the evaporator, which is cooled by the evaporator, and a refrigerator compartment configured to keep a food item refrigerated using the air around the evaporator. In some cases, the storage part 20 may include any one of the freezer compartment and the refrigerator compartment.

A rotation speed of the fan for making ice 30 may change as a result of control exerted by the controller 10, and may allow air in one area of the storage part 20 to flow to the ice making compartment 40 through the flow path for making ice 50. That is, the fan for making ice 30 may allow the air cooled by the evaporator to flow to the ice making compartment 40 through the flow path for making ice 50. The rotation speed of the fan for making ice 30 may change while the fan for making ice 30 continues to operate during operation of the compressor of the storage part 20.

The flow path for making ice 50 may connect between one area of the storage part 20 and the ice making compartment 40. One area of the storage part 20, described above, may be a cooling compartment in which an evaporator is disposed, or the freezer compartment.

The ice making compartment 40 may make ice or store ice using cool air introduced through the flow path for making ice 50. Though not illustrated, a temperature sensor for measuring a temperature (e.g., an inner temperature) of the ice making compartment 40 may be disposed in the ice making compartment 40.

Figure 5:
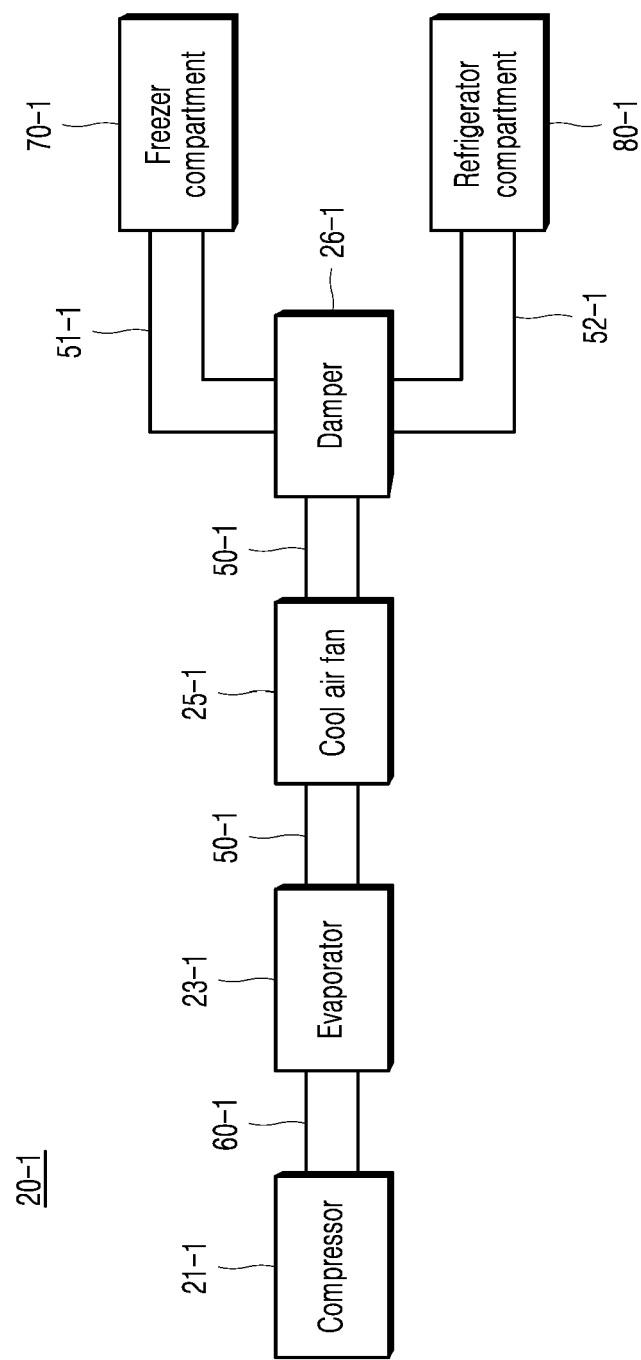
FIG. 5 is a block diagram schematically showing a first example of a storage part of the refrigerator in one embodiment of FIG. 1.

FIG. 5 is a block diagram schematically showing a first example of a storage part of the refrigerator in one embodiment of FIG. 4. The storage part 20-1 of the refrigerator in one embodiment may include a compressor 21-1, an evaporator 23-1, a cool air fan 25-1, a damper 26-1, a freezer compartment 70-1, a refrigerator compartment 80-1, a refrigerant flow path 60-1, a cool air flow path 50-1, a freezing flow path 51-1, and a refrigerating flow path 52-1. Though not illustrated in FIG. 2, the storage part 20-1 may further include a condenser and an expansion valve.

The compressor 21-1 may compress refrigerants based on control by the controller 10. The evaporator 23-1 may connect with the compressor 21-1 through the refrigerant flow path 60-1. The evaporator 23-1 may cool air around the evaporator as a result of heat exchange between refrigerants flowing through a flow path in the evaporator 23-1 and the air around the evaporator. The evaporator 23-1 may be disposed in a cooling compartment.

The cool air fan 25-1 may operate based on control by the controller 10. The cool air fan 25-1 may allow air (e.g., air of the cooling compartment in which the evaporator 23-1 is disposed) around the evaporator 23-1 to flow through the cool air flow path 50-1.

The damper 26-1 may allow the cool air flow path 50-1 to communicate with the freezing flow path 51-1 or allow the cool air flow path 50-1 to communicate with the refrigerating flow path 52-1 based on control by the controller 10. That is, the damper 26-1 may allow the air (e.g., air of the cooling compartment in which the evaporator 23-1 is disposed) around the evaporator 23-1 to flow to the freezer compartment 70-1 through the freezing flow path 51-1 or to the refrigerator compartment 80-1 through the refrigerating flow path 52-1, based on control by the controller 10. The damper 26-1 may operate on a regular basis. That is, a single cycle may be comprised of a combination of a freezing time period for which the freezer compartment 70-1 is cooled and a refrigerating time period for which the refrigerator compartment 80-1 is cooled. The damper 26-1 may operate such that cool air is alternately supplied to the freezer compartment 70-1 and the refrigerator compartment 80-1 on a regular basis.

The freezer compartment 70-1 may keep a food item frozen, and the refrigerator compartment 80-1 may keep a food item refrigerated.

The refrigerant flow path 60-1 may connect between the compressor 21-1 and the evaporator 23-1, and refrigerants may flow through the refrigerant flow path 60-1. The cool air flow path 50-1 may connect between an area (e.g., the cooling compartment in which the evaporator 23-1 is disposed) around the evaporator 23-1 and the damper 26-1. The freezing flow path 51-1 may connect between the damper 26-1 and the freezer compartment 70-1, and the refrigerating flow path 52-1 may connect between the damper 26-1 and the refrigerator compartment 80-1.

As described above, the flow path for making ice (50 in FIG. 4) may connect between the cooling compartment, in which the evaporator 23-1 is disposed, and the ice making compartment (40 in FIG. 4) or connect between the freezer compartment 70-1 and the ice making compartment (40 in FIG. 4). In some cases, any one of the freezer compartment 70-1 and the refrigerator compartment 80-1 may be omitted.

Figure 6:
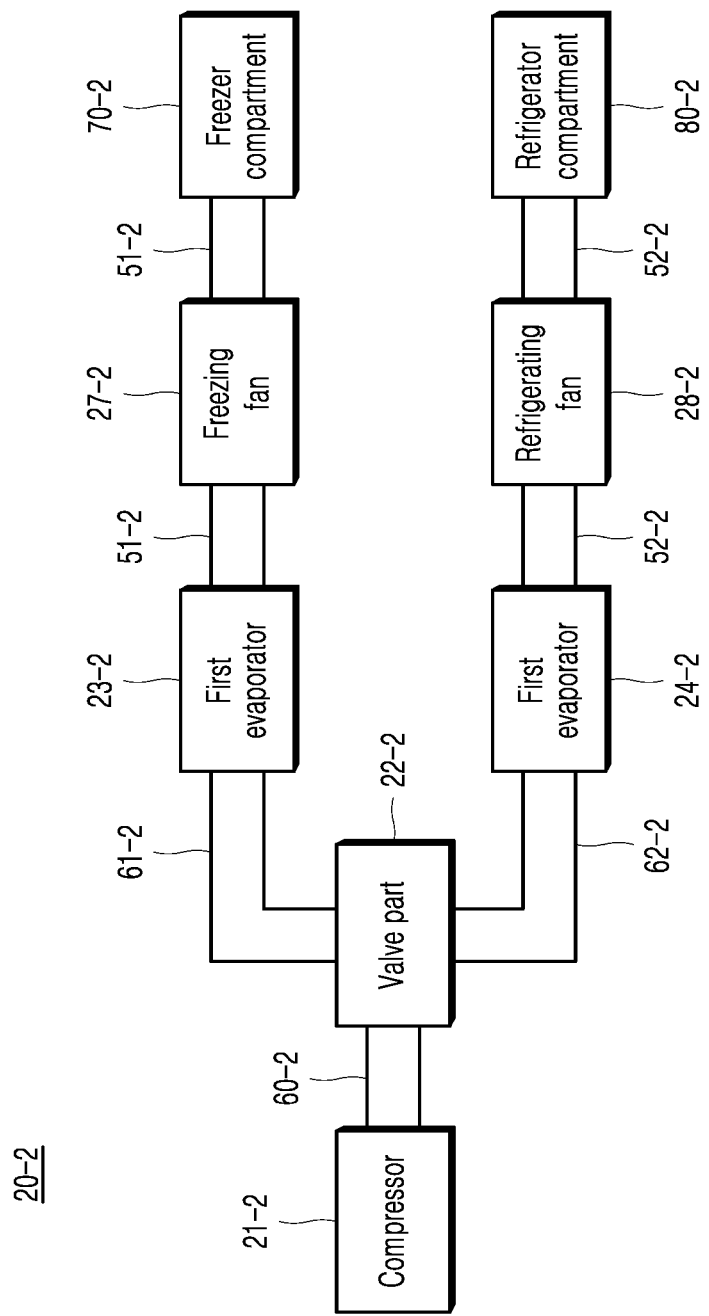
FIG. 6 is a block diagram schematically showing a second example of the storage part of the refrigerator in one embodiment of FIG. 1.

FIG. 6 is a block diagram schematically showing a second example of the storage part of the refrigerator in one embodiment of FIG. 4. The storage part 20-2 of the refrigerator in one embodiment may include a compressor 21-2, a valve part 22-2, a first evaporator 23-2, a second evaporator 24-2, a freezing fan 27-2, a refrigerating fan 28-2, a freezer compartment 70-2, a refrigerator compartment 80-2, refrigerant flow paths 60-2, 61-2, 62-2 and cool air flow paths 51-2, 52-2. Though not illustrated in FIG. 3, the storage part 20-2 may further include a condenser and an expansion valve.

The compressor 21-2, the first evaporator 23-2, the second evaporator 24-2, the freezer compartment 70-2, and the refrigerator compartment 80-2 may have substantially the same functions as the compressor 21-1, the evaporator 23-1, the freezer compartment 70-1, and the refrigerator compartment 80-1 that are described with reference to FIG. 5.

The freezing fan 27-2 may operate based on control by the controller 10. The freezing fan 27-2 may allow air (e.g., air of a first cooling compartment in which the first evaporator 23-2 is disposed) around the first evaporator 23-2 to flow to the freezer compartment 70-2 through the cool air flow path 51-2.

The refrigerating fan 28-2 may operate based on control by the controller 10. The refrigerating fan 28-2 may allow air (e.g., air of a second cooling compartment in which the second evaporator 24-2 is disposed) around the second evaporator 24-2 to flow to the refrigerator compartment 80-2 through the cool air flow path 52-2.

The valve part 22-2 may allow the refrigerant flow path 60-2 to communicate with the refrigerant flow path 61-2 or allow the refrigerant flow path 60-2 to communicate with the refrigerant flow path 62-2 based on control by the controller 10. That is, the valve part 22-2 may connect the compressor 21-2 and the first evaporator 23-2 to cool the freezer compartment 70-2 or connect the compressor 21-2 with the second evaporator 24-2 to cool the refrigerator compartment 80-2, based on control by the controller 10. The valve part 22-2 may operate on a regular basis. That is, a single cycle may be comprised of a combination of a freezing time period for which the freezer compartment 70-2 is cooled and a refrigerating time period for which the refrigerator compartment 80-2 is cooled. The valve part 22-2 may operate such that the freezer compartment 70-2 and the refrigerator compartment 80-2 are alternately cooled on a regular basis. The valve part 22-2 may include a three-way valve or a three-way valve and two valves.

As described above, the flow path for making ice (50 in FIG. 4) may connect between the cooling compartment, in which the evaporator 23-2 is disposed, and the ice making compartment (40 in FIG. 4) or may connect between the freezer compartment 70-2 and the ice making compartment (40 in FIG. 4). In some cases, any one of the freezer compartment 70-2 and the refrigerator compartment 80-2 may be omitted. Further, in some cases, the freezing fan 27-2 and/or the refrigerating fan 28-2 may be omitted.

Figure 7:
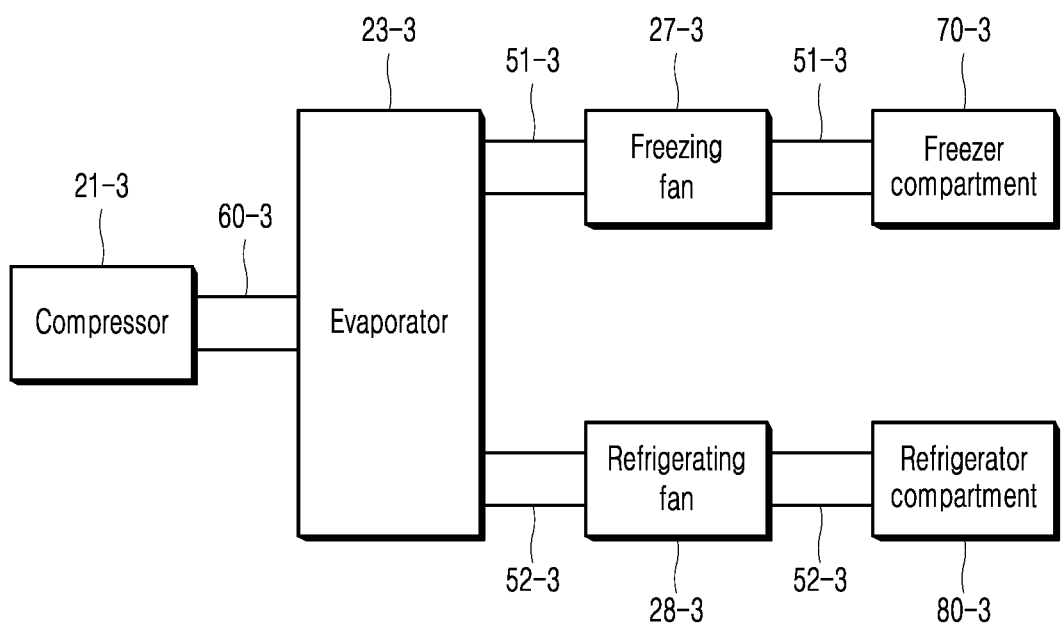
FIG. 7 is a block diagram schematically showing a third example of the storage part of the refrigerator in one embodiment of FIG. 1.

FIG. 7 is a block diagram schematically showing a third example of the storage part of the refrigerator in one embodiment of FIG. 4. The storage part 20-3 of the refrigerator in one embodiment may include a compressor 21-3, an evaporator 23-3, a freezing fan 27-3, a refrigerating fan 28-3, a freezer compartment 70-3, a refrigerator compartment 80-3, a refrigerant flow path 60-3 and cool air flow paths 51-3, 52-3. Though not illustrated in FIG. 7, the storage part 20-3 may further include a condenser and an expansion valve.

The compressor 21-3, the evaporator 23-3, the freezer compartment 70-3, and the refrigerator compartment 80-3 may have substantially the same functions as the compressor 21-1, the evaporator 23-1, the freezer compartment 70-1, and the refrigerator compartment 80-1 that are described with reference to FIG. 5.

The freezing fan 27-3 may operate based on control by the controller 10. The freezing fan 27-3 may allow air (e.g., air of a cooling compartment in which an evaporator 23-3 is disposed) around the evaporator 23-3 to flow to the freezer compartment 70-3 through the cool air flow path 51-3.

The refrigerating fan 28-3 may operate based on control by the controller 10. The refrigerating fan 28-3 may allow air (e.g., air of the cooling compartment in which the evaporator 23-3 is disposed) around the evaporator 23-3 to flow to the refrigerator compartment 80-3 through the cool air flow path 52-3.

The freezing fan 27-3 and the refrigerating fan 28-3 may operate on a regular basis. That is, a single cycle may be comprised of a combination of a freezing time period for which the freezer compartment 70-3 is cooled and a refrigerating time period for which the refrigerator compartment 80-3 is cooled. The freezing fan 27-3 and the refrigerating fan 28-3 may alternately operate on a regular basis such that the freezer compartment 70-3 and the refrigerator compartment 80-3 are alternately cooled.

As described above, the flow path for making ice (50 in FIG. 4) may connect between the cooling compartment in which the evaporator 23-3 is disposed and the ice making compartment (40 in FIG. 4) or connect between the freezer compartment 70-3 and the ice making compartment (40 in FIG. 4). In some cases, any one of the freezer compartment 70-3 and the refrigerator compartment 80-3 may be omitted.

Figure 8:
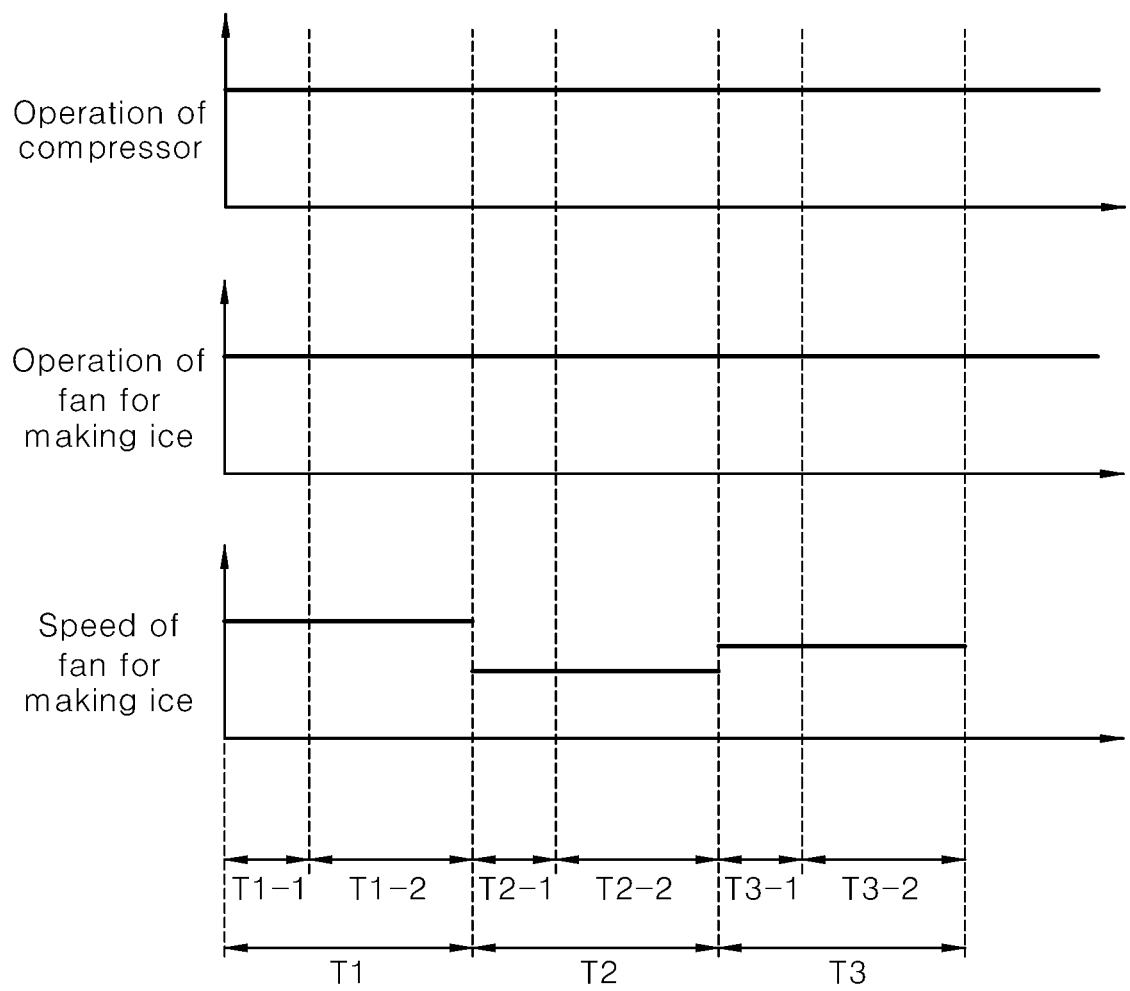
FIGS. 8 and 9 are views respectively for describing a control method of a refrigerator in one embodiment.
Figure 9:
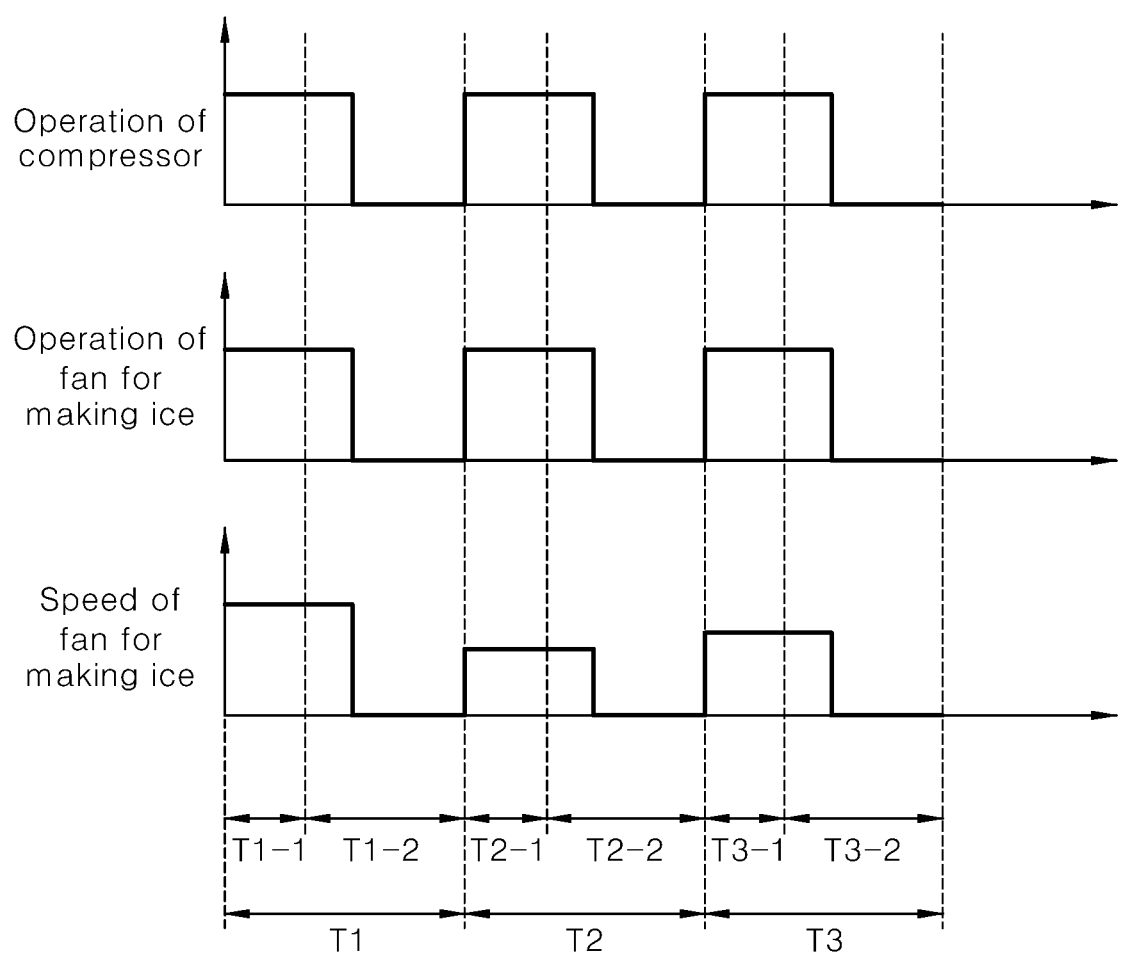

FIGS. 8 and 9 are views respectively for describing a control method of a refrigerator in one embodiment. Specifically, FIG. 8 shows a continuous operation of a compressor, and FIG. 9 shows a sporadic operation of a compressor.

When the compressor continues to operate as shown in FIG. 8, temperatures of the refrigerator compartment and/or the freezer compartment may be adjusted as a result of adjustment of an operation frequency and the like of the compressor.

When the compressor operates sporadically as shown in FIG. 9, temperatures of the refrigerator compartment and/or the freezer compartment may be adjusted as a result of adjustment of operation time and the like of the compressor. In some embodiments, a speed of the fan may be controlled in addition to the operation frequency and/or operation time of the compressor to adjust the temperatures of the refrigerator compartment and/or the freezer compartment.

Referring to FIGS. 8 and 9, a single operation cycle T1, T2, or T3 may include a freezing period T1-1, T2-1, or T3-1 for which the freezer compartment is cooled, and a refrigerating period T1-2, T2-2, or T3-2 for which the refrigerator compartment is cooled.

During the freezing period T1-1, T2-1, or T3-1, the freezer compartment may be cooled. In the first example of FIG. 5, during the freezing period T1-1, T2-1, or T3-1, the damper (26-1 in FIG. 5) may allow the cool air flow path 50-1 to communicate with the freezing flow path 51-1. In the second example of FIG. 6, during the freezing period T1-1, T2-1, or T3-1, the valve part (22-2 in FIG. 6) may allow the refrigerant flow path 60-2 to communicate with the refrigerant flow path 61-2. In the third example of FIG. 7, during the freezing period T1-1, T2-1, or T3-1, the freezing fan 27-3 may operate and the refrigerating fan 28-3 may stop. Accordingly, during the freezing period T1-1, T2-1, or T3-1, air cooled by the evaporator may flow into the freezer compartment.

During the refrigerating period T1-2, T2-2, or T2-3, the refrigerator compartment may be cooled. In the first example of FIG. 5, during the refrigerating period T1-2, T2-2, or T3-2, the damper (26-1 in FIG. 5) may allow the cool air flow path 50-1 to communicate with the refrigerating flow path 52-1. In the second example of FIG. 6, during the refrigerating period T1-2, T2-2, or T3-2, the valve part (22-2 in FIG. 6) may allow the refrigerant flow path 60-2 to communicate with the refrigerant flow path 62-2. In the third example of FIG. 7, during the refrigerating period T1-2, T2-2, or T3-2, the freezing fan 27-3 may stop and the refrigerating fan 28-3 may operate. Accordingly, during the refrigerating period T1-2, T2-2, or T3-2, air cooled by the evaporator may flow into the refrigerator compartment.

Referring to FIGS. 8 and 9, the fan for making ice may always operate during the operation of the compressor, but a temperature of the ice making compartment may be adjusted as a result of adjustment of a speed of the fan for making ice. Specifically, the fan for making ice may operate at a predetermined speed in a first operation cycle. Then the speed of the fan for making ice in an $n^{th}$ (n denoting any natural numbers of 2 or greater) operation cycle may be determined in response to an average of temperatures of the ice making compartment, measured in an $n-1^{th}$ operation cycle.

FIGS. 8 and 9 show a single operation cycle comprised of a period for which the freezer compartment is cooled and a period for which the refrigerator compartment is cooled. However, the period for which the freezer compartment is cooled or the period for which the refrigerator compartment is cooled may constitute a single operation cycle. That is, the refrigerator in one embodiment, as described above, may be provided only with any one of the freezer compartment and the refrigerator compartment. In this case, any one of the period for which the freezer compartment is cooled or the period for which the refrigerator compartment is cooled may constitute a single operation cycle.

As illustrated in FIG. 8, a refrigerator and/or a control method thereof in one embodiment may be applied when the compressor continues to operate. During a continuous operation of the compressor, the temperature of the storage part (i.e., the refrigerator compartment and/or the freezer compartment) may remain constant. Additionally, a continuous operation of the compressor may reduce energy consumption and noise further than a sporadic operation of the compressor.

In the control method of the related art according to document 1, a time point for operation of the fan for making ice configured to supply cool air to the ice making compartment synchronizes with a time point for a start of operation of the compressor. However, it is not easy to apply the synchronization between the time points when the compressor continues to operate. That is, in the control method of the related art, when the compressor continues to operate, a target temperature needs to be lower than expected. In this case, the ice making compartment may be overly cooled.

In one embodiment, when the compressor continues to operate, the operation speed of the fan for making ice may change based on the operation cycle of the refrigerator, while the fan for making ice continues to operate. Thus, the ice making compartment may not be overly cooled, and the temperature of the ice making compartment may be adjusted properly. In particular, when the ice making compartment is full of ice, or when the ice making compartment is inactive, a big change in the temperature of the ice making compartment may be prevented.

As illustrated in FIG. 9, the refrigerator and/or the control method thereof in one embodiment may be applied to a sporadic operation of the compressor as well as a continuous operation of the compressor. In one embodiment, the temperature of the ice making compartment may be adjusted to a target temperature even when the compressor operates sporadically.

Figure 10:
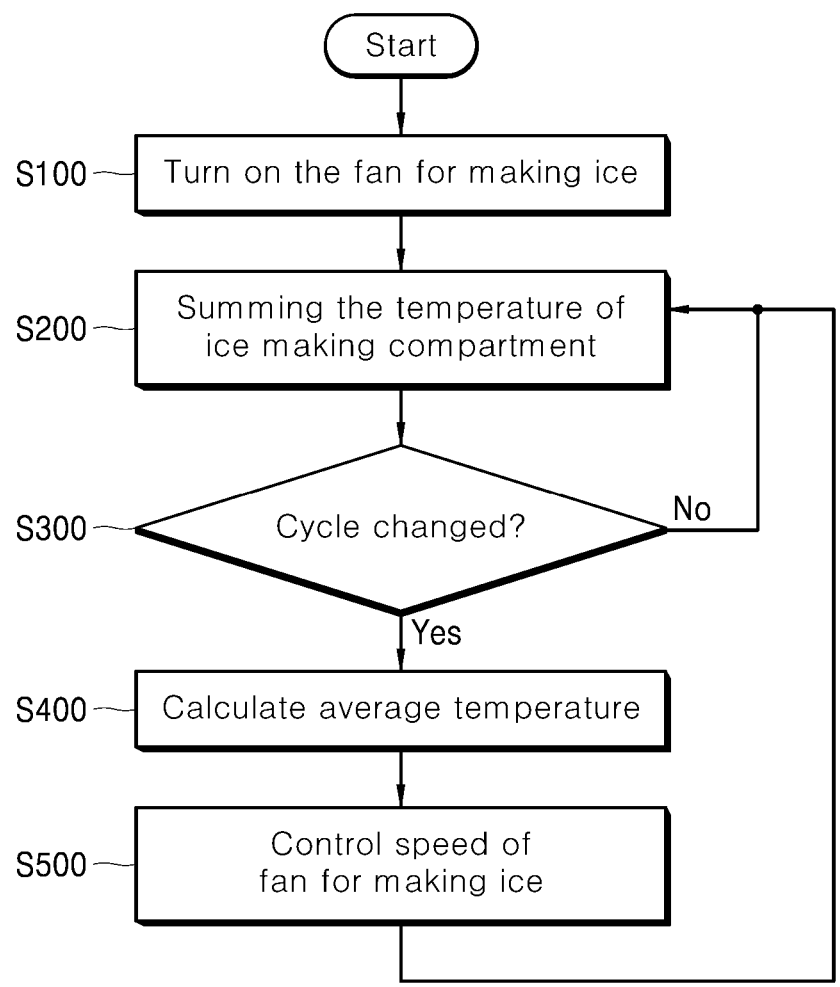
FIGS. 10 and 11 are operation flow charts respectively for describing the control method of a refrigerator in one embodiment.

FIG. 10 is an operation flow chart for describing the control method of a refrigerator in one embodiment, and shows a control method during a continuous operation of the compressor. Each step in FIG. 10 may be performed by the controller (10 in FIG. 4).

The controller may operate the fan for making ice (step 100). For example, the controller may control the fan for making ice such that the fan for making ice rotates at a predetermined speed. The predetermined speed may be a maximum speed, or a minimum speed, or any value (e.g., an intermediate value) among values between the maximum speed and the minimum speed.

Then the controller may receive a measured temperature of the ice making compartment and add up the measured temperature received (step 200).

Then the controller may determine whether the operation cycle is changed (step 300).

When the operation cycle is changed as a result of the determination in step 300, the controller may calculate an average temperature (i.e., an average of the measured temperatures of the ice making compartment) (step 400).

Then the controller may control the speed of the fan for making ice based on the average temperature (step 500).

Figure 11:
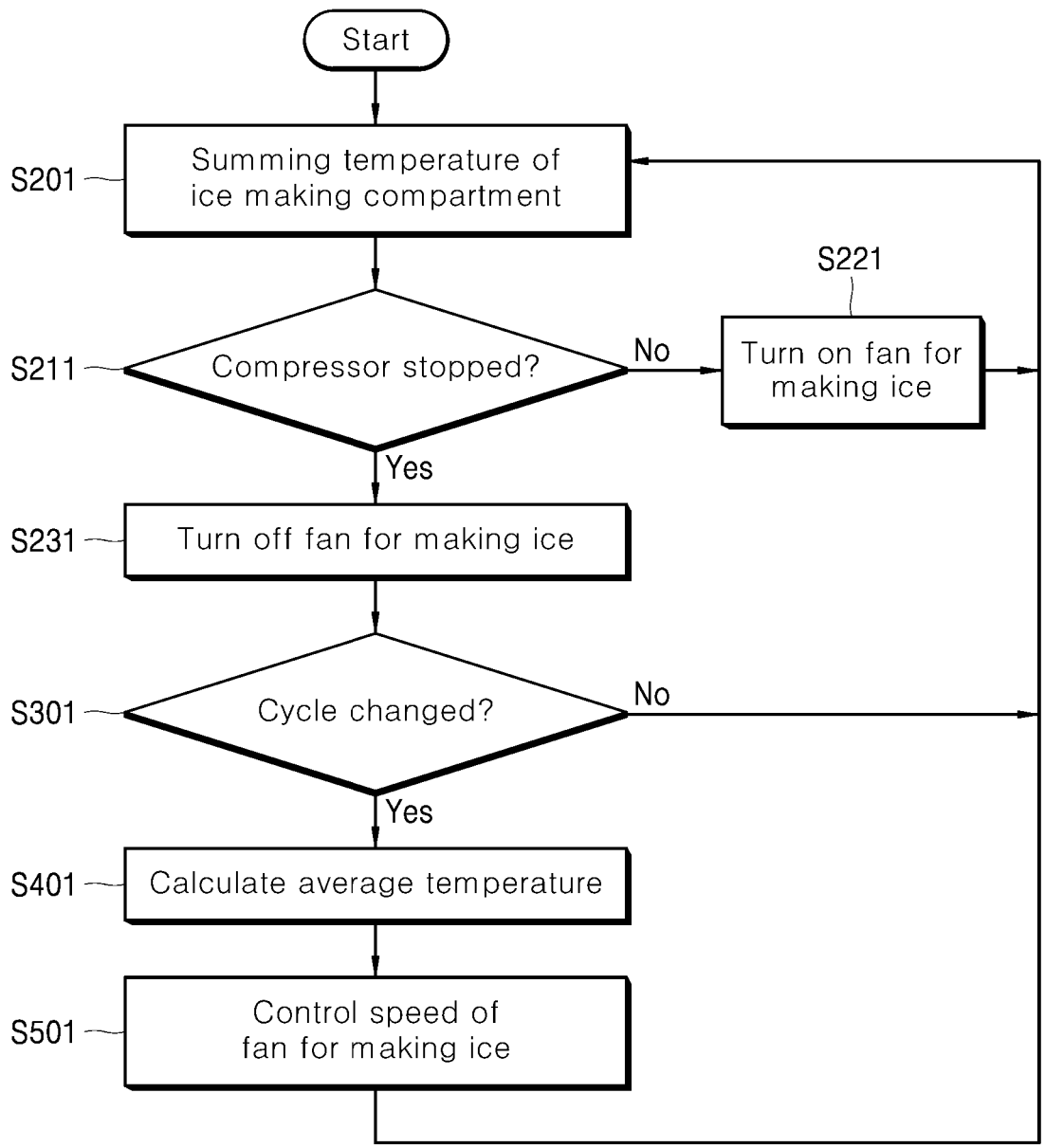

FIG. 11 is an operation flow chart for describing the control method of a refrigerator in one embodiment, and shows a control method during a sporadic operation of the compressor. Each step in FIG. 11 may be performed by the controller (10 in FIG. 4).

Then the controller may receive a measured temperature of the ice making compartment and add up the measured temperature received (step 201).

Then the controller may determine whether the compressor is stopped (step 211).

When the compressor is not stopped as a result of the determination in step 211, the controller may operate the fan for making ice (step 221). In step 221, the controller may control the fan for making ice such that the fan for making ice rotates at the predetermined speed or at a speed set in step 501. For example, the controller may control the fan for making ice such that the fan for making ice rotates at the predetermined speed in the first operation cycle, and in an operation cycle following the first operation cycle, may control the fan for making ice such that the fan for making ice rotates at a speed that is set as a result of performance of step 501 in a precious operation cycle of the operation cycle following the second operation cycle.

When the compressor is stopped as a result of the determination in step 211, the controller may stop operation of the fan for making ice (step 231).

Then the controller may determine whether the operation cycle is changed (step 301).

When the operation cycle is changed as a result of the determination in step 301, the controller may calculate an average temperature (i.e., an average of the measured temperatures of the ice making compartment) (step 401).

Then the controller may control the speed of the fan for making ice based on the average temperature (step 501).

Figure 12:
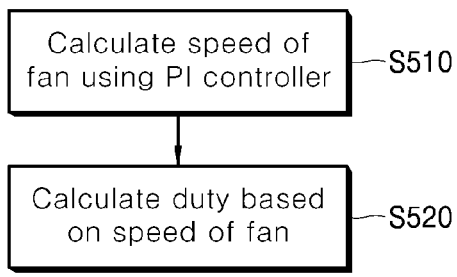
FIG. 12 is an operation flow chart for describing examples of steps of controlling a speed of a fan for making ice according to the control method of a refrigerator in one embodiment of FIGS. 10 and 11.

FIG. 12 is an operation flow chart for describing examples of steps (step 500 in FIG. 10 and step 501 in FIG. 11) of controlling a speed of a fan for making ice according to the control method of a refrigerator in one embodiment of FIGS. 10 and 11. Each step in FIG. 12 may be performed by the controller (10 in FIG. 4).

The controller may calculate the speed of the fan based on the average temperature of the ice making compartment, calculated in step 300 or step 301, (step 510). In step 510, the controller may calculate the speed of the fan using a PI controller. For example, the controller may calculate the speed of the fan using the proportional plus integral controller (PI controller) that uses a difference between the average temperature of the ice making compartment and a target temperature as an input value. Specifically, the controller may calculate the speed of the fan using an equation (Herein, $V(t)$ denoting the speed of the fan, $e(t)$ denoting a difference between the average temperature and the target temperature, KP denoting a proportional gain, and KI denoting a storage gain.).

Then the controller may calculate a duty of a control signal corresponding to the speed of the fan for making ice, calculated in step 510, and may supply a control signal having the calculated duty to the fan for making ice (step 520).

In FIGS. 8 to 12, the rotation speed of the fan for making ice is adjusted based on the operation cycle while the fan for making ice continues to operate. However, the operation time of the fan for making ice may be adjusted based on the operation cycle. That is, based on the average temperature calculated in step 400 in FIG. 10 and/or step 401 in FIG. 11, the controller may calculate operation time of the fan for making ice in a following operation cycle and then operate the fan for making ice for the calculated operation time in the following operation cycle.

FIGS. 13 to 16 are views respectively for describing operation of the refrigerator in the refrigerator and/or the control method of the refrigerator of one embodiment.

Figure 13:
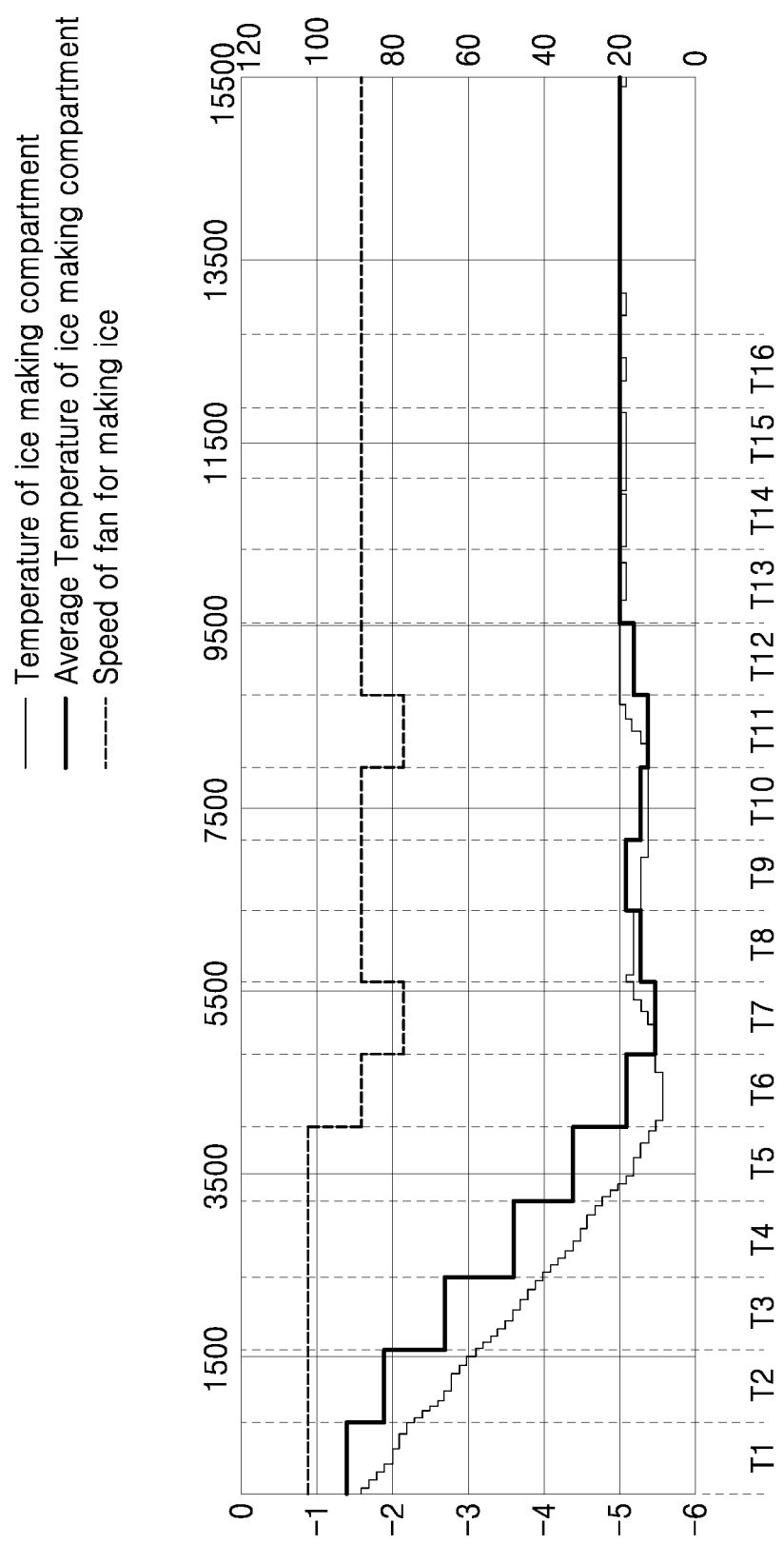
FIGS. 13 to 16 are views respectively for describing operation of the refrigerator in the refrigerator and/or the control method of the refrigerator of one embodiment.

FIG. 13 shows temperatures and average temperatures of the ice making compartment and speeds of the fan for making ice of the refrigerator in one embodiment when the target temperature is −5° C. In FIG. 13, an average temperature of the ice making compartment in the period of T(n) (n denoting natural numbers) denotes an average of temperatures of the ice making compartment, measured in the period of T(n−1).

As illustrated in FIG. 13, in one embodiment, the temperature and the average temperature of the ice making compartment may be maintained at the target temperature of −5° C. after the 12th cycle (T12) following an interim period.

Figure 14:
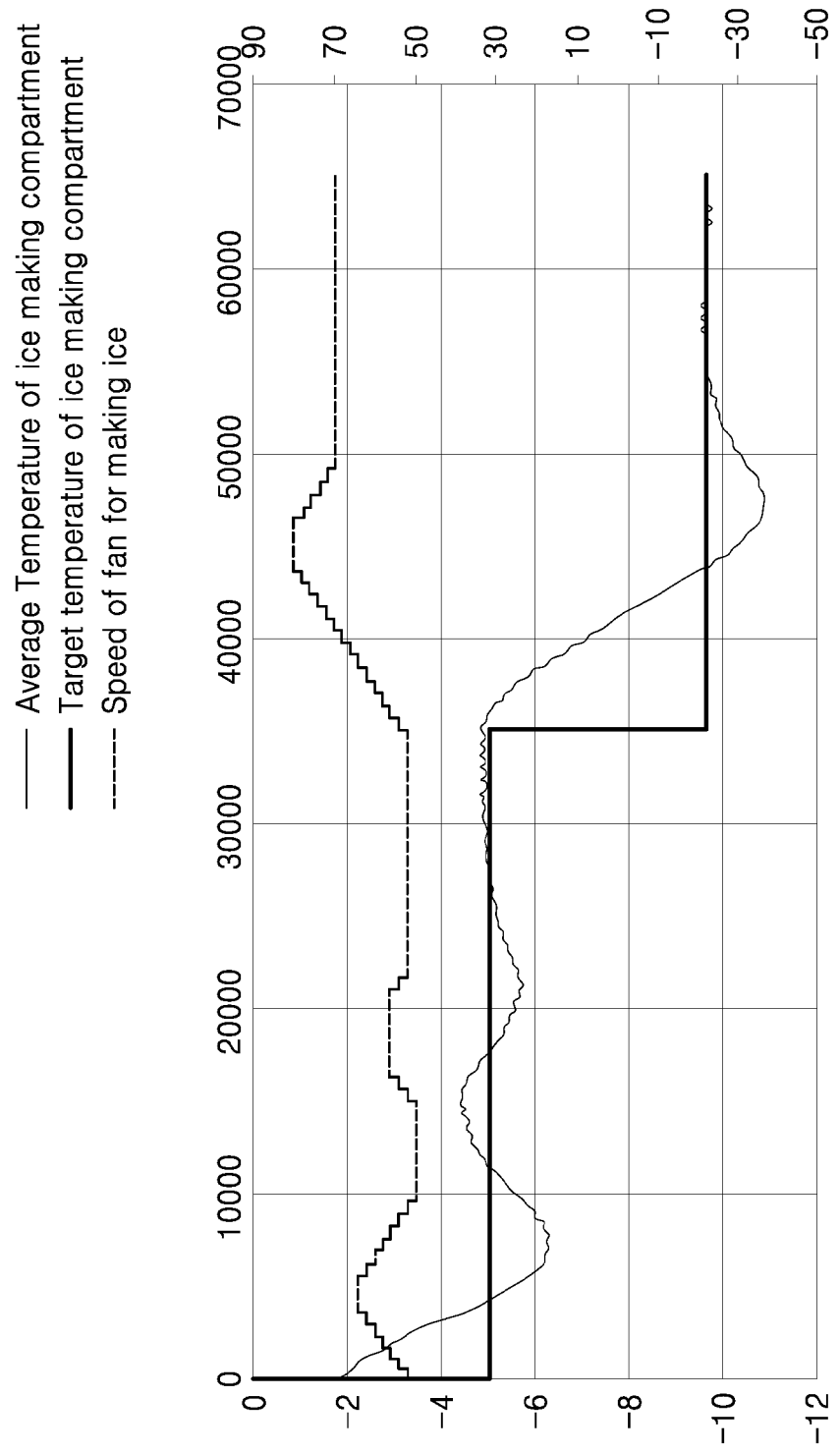

FIG. 14 shows speeds and temperatures (average temperatures) of the fan for making ice when the target temperature of the ice making compartment decreases, for example, when the user decreases the temperature of the ice making compartment to a desired temperature using the controller and the like of the refrigerator, or when the ice making compartment makes ice, and the like.

In one embodiment, when the target temperature of the ice making compartment decreases, the speed of the fan for making ice may increase, and after the interim period passes, the temperature (an average temperature) of the ice making compartment may be maintained at the decreased target temperature of the ice making compartment, as illustrated in FIG. 14.

Figure 15:
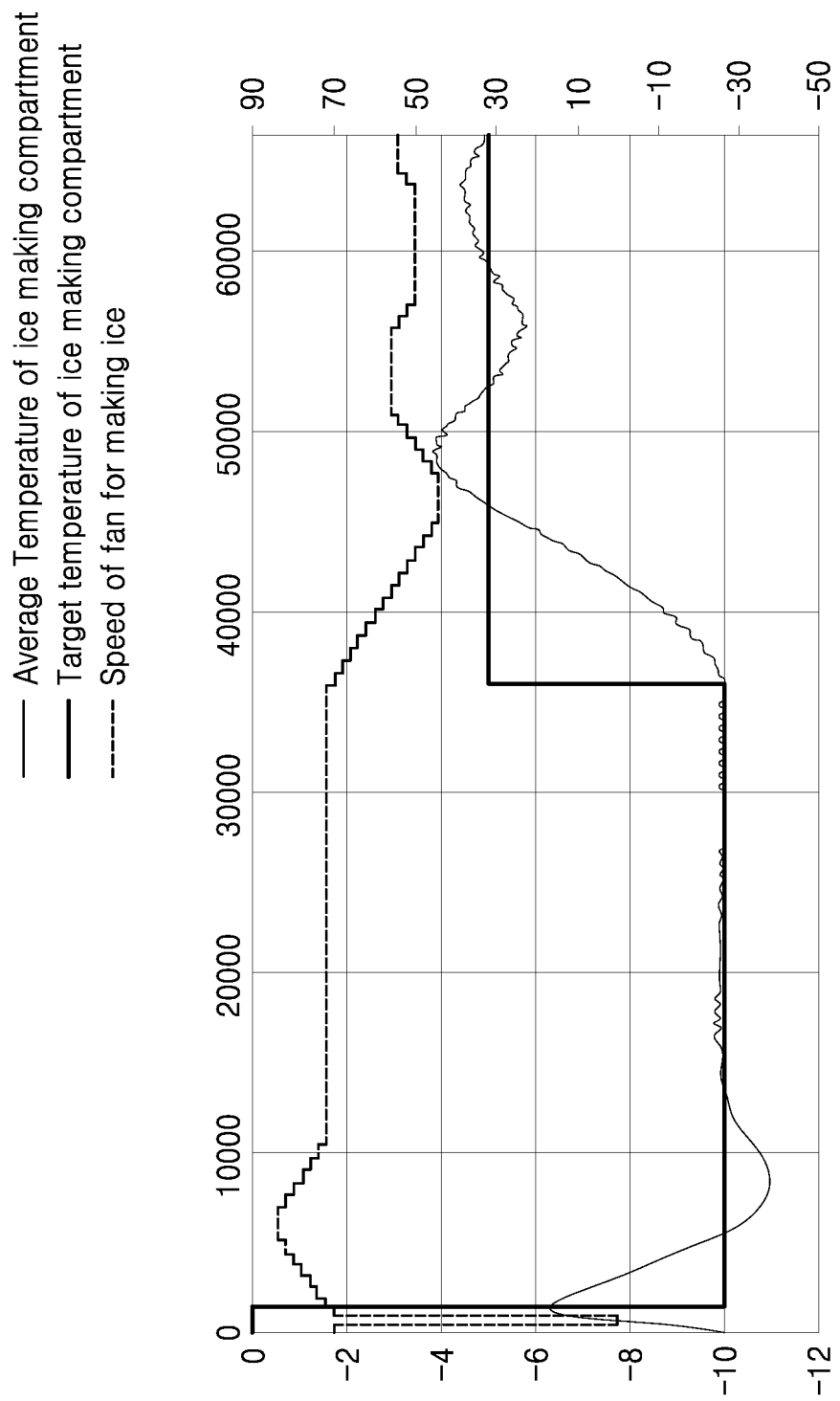

FIG. 15 shows speeds and temperatures (average temperatures) of the fan for making ice when the target temperature of the ice making compartment increases, for example, when the user increases the temperature of the ice making compartment to a desired temperature using the controller and the like of the refrigerator or turns off the ice making compartment such that the ice making compartment only keeps produced ice, and the like.

In one embodiment, when the target temperature of the ice making compartment increases, the speed of the fan for making ice may decrease, and after the interim period passes, the temperature (an average temperature) of the ice making compartment may be maintained at the increased target temperature of the ice making compartment, as illustrated in FIG. 15.

Figure 16:
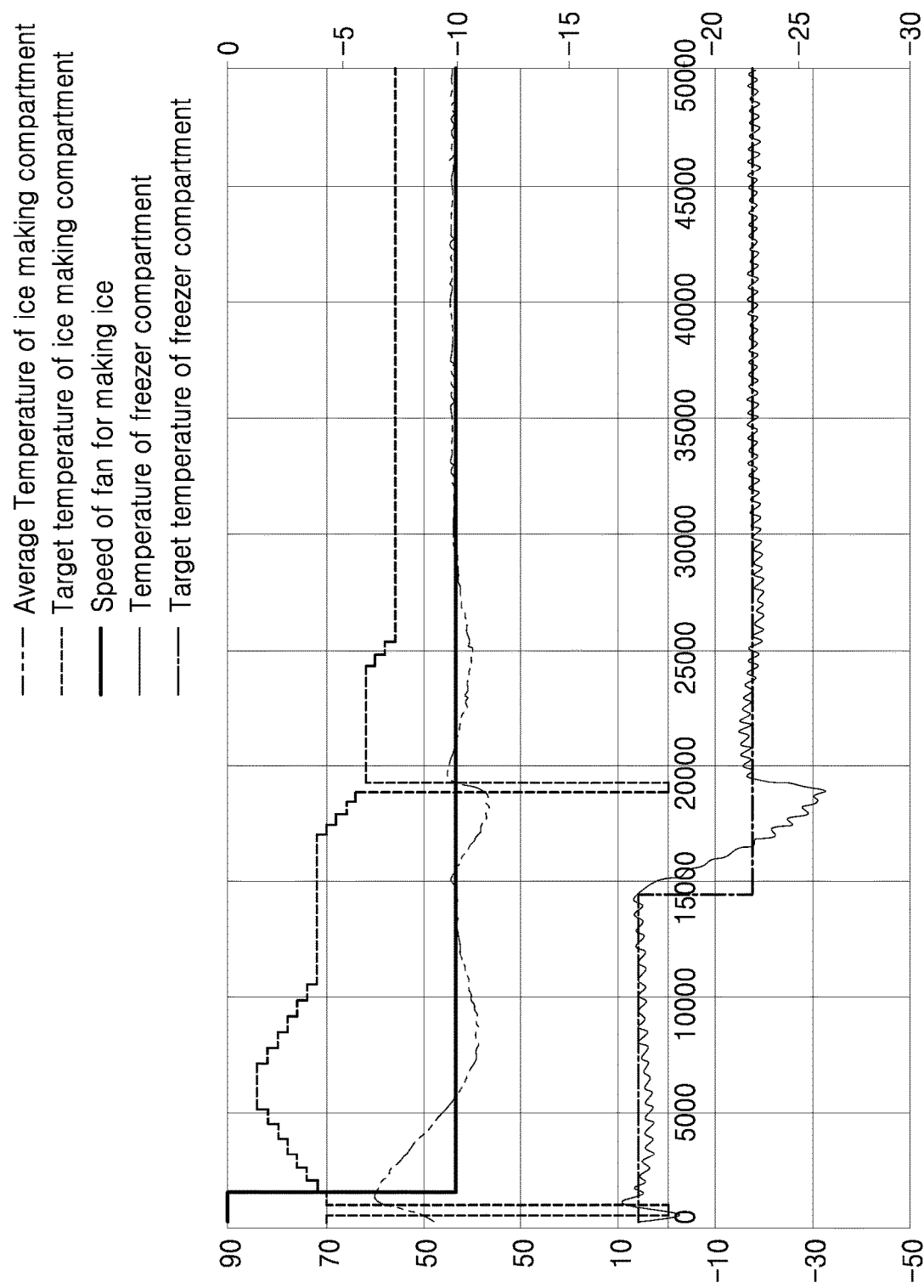

FIG. 16 shows temperatures of the freezer compartment, speeds of the fan for making ice, and temperatures (average temperatures) of the ice making compartment when the target temperature of the freezer compartment decreases while the target temperature of the ice making compartment is maintained.

Ordinarily, cool air supplied to the ice making compartment is cool air of the freezer compartment or cool air of the cooling compartment (an area in which an evaporator is disposed) adjacent to the freezer compartment.

In the related art, when a target temperature of a freezer compartment decreases, a temperature of an ice making compartment may decrease. That is, cool air flows to the ice making compartment unnecessarily. Thus, it takes a long time for a temperature of the freezer compartment to reach the target temperature, causing unnecessary energy consumption.

In one embodiment, when the target temperature of the freezer compartment decreases, the speed of the fan for making ice may decrease, and after the interim period passes, the temperature (the average temperature) of the ice making compartment may be maintained at the set target temperature despite a decrease in the temperature of the freezer compartment, as illustrated in FIG. 16.

In one embodiment, the temperature of the ice making compartment may remain constant. In particular, even when the freezer compartment and the refrigerator compartment are alternately cooled using a single compressor, the temperature of the ice making compartment may be maintained at the target temperature, thereby preventing the ice making compartment from cooling excessively and reducing electricity consumption.

Further, in one embodiment, the temperature of the ice making compartment may be controlled in a state in which the ice making compartment is full of ice or is turned off. Thus, the ice making compartment may be prevented from cooling excessively in the state in which the ice making compartment is full of ice or is turned off.

The present disclosure is directed to a refrigerator and/or a control method thereof that may prevent an ice making compartment from cooling excessively.

The present disclosure is directed to a refrigerator and/or a control method thereof that may maintain a temperature of an ice making compartment stably despite a change in a target temperature of a freezer compartment and/or a refrigerator compartment.

The present disclosure is directed to a refrigerator and/or a control method thereof that may maintain a temperature of an ice making compartment stably despite a change in operation time and/or an operation ratio of a compressor.

The present disclosure is directed to a refrigerator and/or a control method thereof that may maintain an average temperature of an ice making compartment, in particular, an average temperature of an ice making compartment full of ice stably, thereby reducing unnecessary energy consumption.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

A refrigerator and/or a control method thereof in one embodiment may change a speed of a fan for making ice while the fan for making ice continues to operate during operation of a compressor. In this case, the speed of the fan for making ice may be adjusted in accordance with an operation cycle of the refrigerator. And/or the speed of the fan for making ice may be adjusted in response to a difference between a measured temperature (or an average of measured temperatures) of the ice making compartment and a target ice-making temperature.

The refrigerator and/or the control method thereof in one embodiment may control the speed of the fan for making ice based on the temperature of the ice making compartment. In particular, the refrigerator and/or the control method thereof in one embodiment may determine a speed of the fan for making ice in an $n^{th}$ cycle based on an average temperature of the ice making compartment in the $n-1^{th}$ cycle while controlling the speed of the fan for making ice based on the operation cycle of the refrigerator.

The refrigerator and/or the control method thereof in one embodiment may control the speed of the fan for making ice based on a difference between a target temperature of the ice making compartment and a measured temperature (or an average of measured temperatures) of the ice making compartment.

The refrigerator and/or the control method thereof in one embodiment may control the speed of the fan for making ice when the ice making compartment is full of ice and/or turned off.

A refrigerator in one embodiment may include a storage part comprising a compressor and an evaporator and configured to store a food item at a low temperature using air cooled by the evaporator, an ice making compartment configured to make or store ice using air cooled by the evaporator, and a fan for making ice configured to allow air cooled by the evaporator to flow to the ice making compartment, and a rotation speed of the fan for making ice may change while the fan for making ice continues to operate during operation of the compressor.

In the refrigerator, the storage part may operate based on an operation cycle, and the rotation speed of the fan for making ice may change in synchronization with the operation cycle.

In the refrigerator, the storage part may include a freezer compartment into which air cooled by the evaporator flows during a freezing time period of the operation cycle, and a refrigerator compartment into which air cooled by the evaporator flows during a refrigerating time period of the operation cycle.

The refrigerator in one embodiment may further include a controller configured to control the compressor and the fan for making ice, and the controller may determine a speed of the fan for making ice in an $n^{th}$ operation cycle, based on an average of temperatures of the ice making compartment measured during an $n-1^{th}$ (n denoting any natural numbers of two or greater) operation cycle, and may operate the fan for making ice at the determined speed.

In the refrigerator, the controller may calculate a difference between the average and a target temperature of the ice making compartment, and may input the temperature difference to a proportional plus integral controller to determine a speed of the fan for making ice.

In the refrigerator, the storage part may further include a first cool air flow path connected to a cooling compartment in which the evaporator is disposed, a second cool air flow path connected to the freezer compartment, a third cool air flow path connected to the refrigerator compartment, and a damper connected to the first cool air flow path, the second cool air flow path and the third cool air flow path, and allowing the first cool air flow path to communicate with the second cool air flow path during the freezing time period, and allowing the first cool air flow path to communicate with the third cool air flow path during the refrigerating time period.

In the refrigerator, the evaporator may include a first evaporator for cooling the freezer compartment, and a second evaporator for cooling the refrigerator compartment, and the storage part may further include a valve part allowing refrigerants discharged from the compressor to flow to the first evaporator during the freezing time period, and allowing refrigerants discharged from the compressor to flow to the second evaporator during the refrigerating time period.

In the refrigerator, the storage part may further include a freezing fan allowing air around the evaporator to flow to the freezer compartment during the freezing time period, and a refrigerating fan allowing air around the evaporator to flow to the refrigerator compartment during the refrigerating time period.

A control method of a refrigerator in one embodiment, including a storage part comprising a compressor and an evaporator and configured to store a food item at a low temperature using air cooled by the evaporator, an ice making compartment configured to make or store ice using air cooled by the evaporator, an fan for making ice configured to allow air cooled by the evaporator to flow to the ice making compartment, and a controller configured to control the compressor and the fan for making ice, may include adjusting a speed of the fan for making ice by the controller, and operating the fan for making ice at the adjusted speed by the controller while the controller continues to operate the fan for making ice during operation of the compressor.

The control method in one embodiment may further include controlling the storage part by the controller based on an operation cycle, and adjusting a speed of the fan for making ice may be performed in synchronization with the operation cycle.

The control method may further include allowing air cooled by the evaporator to the freezer compartment of the storage part by the controller during a freezing time period of the operation cycle, and allowing air cooled by the evaporator to flow to the refrigerator compartment of the storage part by the controller during a refrigerating time period of the operation cycle.

In the control method, adjusting a speed of the fan for making ice may include receiving a temperature of the ice making compartment and cumulatively calculating the temperature by the controller, determining whether the operation cycle is changed by the controller, and calculating an average of temperatures of the ice making compartment at a time point when the operation cycle is changed and determining a speed of the fan for making ice based on the average by the controller.

A refrigerator and/or a control method thereof in one embodiment may prevent an ice making compartment from cooling excessively and maintain a temperature of the ice making compartment stably. In particular, the ice making compartment may be prevented from cooling excessively in one embodiment even when the refrigerator continues to operate a compressor.

The refrigerator and/or the control method thereof in one embodiment may maintain an average temperature of the ice making compartment stably even when a set temperature of a freezer compartment and/or a refrigerator compartment changes.

The refrigerator and/or the control method thereof in one embodiment may maintain an average temperature of the ice making compartment stably despite a change in operation time or an operation ratio of the compressor, which is caused by a change in load and the like.

The refrigerator and/or the control method thereof in one embodiment may prevent the ice making compartment from cooling excessively and help to reduce electricity consumption.

Specific effects are described along with the above-described effects in the section of Detailed Description.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control method of a refrigerator comprising a storage compartment that includes a compressor, an evaporator, a refrigerator compartment and a freezer compartment, and is configured to provide cooled air based on the evaporator, an ice making compartment configured to receive the cooled air, an ice making fan configured to control flow of the cooled air to the ice making compartment, and a controller configured to control the compressor and the ice making fan, the control method comprising:

operating continuously, by the controller, the ice making fan in synchronization with the compressor during a freezing time period and a refrigerating time period;

adjusting, by the controller, a speed of the ice making fan according to a temperature of the ice making compartment, while the compressor continuously operates during the freezing time period and the refrigerating time period; and operating the ice making fan at the adjusted speed while the controller continues to operate the ice making fan during continuous operation of the compressor.

2. The control method of claim 1, wherein the freezing time period is a time period in which the cooled air is provided to the freezer compartment during operation of the compressor, and the refrigerating time period is a time period in which the cooled air is provided to the refrigerator compartment during operation of the compressor.

3. The control method of claim 1, wherein the adjusting of the speed of the ice making fan includes determining the speed of the ice making fan in an operation cycle, based on an average of temperatures of the ice making compartment during at least one previous operation cycle.

4. The control method of claim 3, wherein the determining of the speed of the ice making fan includes:
   determining a difference between the average of temperatures of the ice making compartment and a target temperature of the ice making compartment, and
   determining the speed of the ice making fan based on the determined difference.

5. The control method of claim 3, wherein the adjusting of the speed of the ice making fan includes determining whether the operation cycle has changed.

6. The control method of claim 5, wherein the adjusting of the speed of the ice making fan includes determining an average temperature of the ice making compartment when the operation cycle is determined to have changed.

7. The control method of claim 1, comprising controlling, by the controller, the storage compartment based on an operation cycle, and
   wherein the adjusting of the speed of the ice making fan is performed in synchronization with the operation cycle.

8. The control method of claim 1, comprising:
   controlling, by the controller, the cooled air to flow to the freezer compartment during the freezing time period of an operation cycle; and
   controlling, by the controller, the cooled air to flow to the refrigerator compartment during the refrigerating time period of the operation cycle.

9. The control method of claim 8, wherein the adjusting of the speed of the ice making fan includes:
   repeatedly receiving a temperature of the ice making compartment;
   determining whether the operation cycle has changed; and
   determining an average of the temperatures of the ice making compartment when the operation cycle is determined to have changed; and
   determining the speed of the ice making fan based on the determined average of the temperatures.

10. A refrigerator, comprising:
    a storage compartment that includes a compressor, an evaporator, a refrigerator compartment and a freezer compartment, and is configured to provide cooled air based on the evaporator;
    an ice making compartment configured to provide ice based on the cooled air based on the evaporator;
    an ice fan configured to control flow of the cooled air to the ice making compartment; and
    a controller configured to control the compressor and the ice fan, wherein the controller is configured to:
    continuously operate the ice fan in synchronization with the compressor during a freezing time period and a refrigerating time period, and
    adjust a rotation speed of the ice fan based on an operation cycle in which the ice fan continues to operate while the compressor continuously operates.

11. The refrigerator of claim 10, wherein the freezing time period is a time period in which the cooled air is provided to the freezer compartment during operation of the compressor, and
    the refrigerating time period is a time period in which the cooled air is provided to the refrigerator compartment during operation of the compressor.

12. The refrigerator of claim 10, wherein the controller is configured to control adjustment of the rotation speed of the ice fan in synchronization with the operation cycle.

13. The refrigerator of claim 10, wherein:
    the freezer compartment is configured to receive the cooled air during the freezing time period of the operation cycle,
    the refrigerator compartment is configured to receive the cooled air during the refrigerating time period of the operation cycle.

14. The refrigerator of claim 13, wherein the controller is configured to:
    determine the rotation speed of the ice fan in an nth operation cycle, based on an average of temperatures of the ice making compartment during at least one operation cycle previous to the nth operation cycle, and
    control the ice fan to operate at the determined rotation speed in the nth operation cycle.

15. The refrigerator of claim 14, wherein the controller is configured to:
    determine a difference between the average of temperatures of the ice making compartment and a target temperature of the ice making compartment, and
    determine the rotation speed of the ice fan based on the determined difference.

16. The refrigerator of claim 13, wherein the storage compartment includes:
    a first cool air flow path to allow air to flow from the evaporator;
    a second cool air flow path to allow air to flow to the freezer compartment;
    a third cool air flow path to allow air to flow to the refrigerator compartment; and
    a damper coupled to the first cool air flow path, the second cool air flow path and the third cool air flow path, the damper is configured to allow the first cool air flow path to communicate with the second cool air flow path during the freezing time period, and the damper is configured to allow the first cool air flow path to communicate with the third cool air flow path during the refrigerating time period.

17. The refrigerator of claim 13, wherein the evaporator comprises:
    a first evaporator configured to cool the freezer compartment; and
    a second evaporator configured to cool the refrigerator compartment,
    wherein the storage compartment includes a valve configured to allow refrigerant from the compressor to flow to the first evaporator during the freezing time period, and to allow refrigerant from the compressor to flow to the second evaporator during the refrigerating time period.

18. The refrigerator of claim 13, wherein the storage compartment includes:
    a freezing fan configured to allow air around the evaporator to flow to the freezer compartment during the freezing time period; and
    a refrigerating fan configured to allow air around the evaporator to flow to the refrigerator compartment during the refrigerating time period.

19. The refrigerator of claim 10, wherein the controller is configured to:
  determine an average temperature of the ice making compartment during different operation cycles, and
  adjust the rotation speed of the ice fan based on the determined average temperature of the ice making compartment.

20. A refrigerator configured to perform the control method of claim 1.

* * * * *